United States Patent [19]

Gaku et al.

[11] 4,370,467
[45] Jan. 25, 1983

[54] CURABLE RESIN COMPOSITION FROM POLYFUNCTIONAL AROMATIC ESTER AND MALEIMIDE COMPOUND

[75] Inventors: Morio Gaku, Showamachi; Nobuyuki Ikeguchi, Tokyo, both of Japan

[73] Assignee: Mitsubishi Gas Chemical Company, Inc., Tokyo, Japan

[21] Appl. No.: 165,560

[22] Filed: Jul. 3, 1980

[30] Foreign Application Priority Data

Jul. 9, 1979 [JP] Japan .................................. 54/86743

[51] Int. Cl.³ ...................... C08G 73/12; C08G 83/00
[52] U.S. Cl. ..................................... 528/322; 525/181; 525/182; 525/185; 525/279; 525/282; 525/422; 525/540; 528/86; 528/117; 528/119; 528/170; 528/172; 528/211; 528/248; 528/253; 528/314; 528/315; 528/317; 528/319; 528/321
[58] Field of Search ................. 528/322, 170, 86, 119, 528/117, 211, 172, 253, 248; 525/181, 182, 185, 279, 282, 540, 422

[56] References Cited

U.S. PATENT DOCUMENTS 3,448,079 6/1969 Grigat et al. ........................... 260/59
3,562,214 2/1971 Kubens et al. ......................... 260/47
4,110,364 8/1978 Gaku et al. ........................... 528/170

FOREIGN PATENT DOCUMENTS 1060933 3/1967 United Kingdom .

Primary Examiner—Harold D. Anderson
Attorney, Agent, or Firm—Fleit & Jacobson

[57] ABSTRACT

A curable resin composition comprising (i) a catalytic composite comprising a peroxide and other catalytic component and (ii) a mixture or a preliminary reaction product of (a) a polyfunctional cyanate ester, prepolymer of the cyanate ester or coprepolymer of the cyanate ester and an amine and (b) a polyfunctional maleimide, prepolymer of the maleimide or coprepolymer of the maleimide and an amine and optionally (c) other component is disclosed. The composition cures rapidly at a low temperature and is preferable from view point of quantity production and workability. The composition is excellent in respect of adhering property, heat-resistance, moisture-resistance and chemical-resistance, and is useful for preparing laminated products, molded products, paint, powder paint, adhesive or varnish.

9 Claims, No Drawings

CURABLE RESIN COMPOSITION FROM POLYFUNCTIONAL AROMATIC ESTER AND MALEIMIDE COMPOUND

BACKGROUND OF THE INVENTION

This invention relates to a curable composition comprising (i) a catalytic composite comprising a peroxide and other catalytic component and (ii) a resin component composed of a mixture and/or preliminary reaction product of (a) at least one compound selected from the group consisting of polyfunctional cyanate esters, prepolymer of the cyanate esters or coprepolymers of the cyanate esters and an amine (sometimes hereinunder referred to as cyanate ester component) and (b) at least one compound selected from the group consisting of polyfunctional maleimides, prepolymers of the maleimides or coprepolymers of the maleimides and an amine (sometimes herein under referred to as maleimide component) and optionally (c) other component.

The composition cures rapidly and is preferable from view point of quantity production and workability. The composition is excellent in respect of adhering property, heat-resistance, moisture-resistance and chemical-resistance, and is useful for preparing laminated product, molded product, point powder paint, adhesive or varnish.

In the prior art, a curable composition comprising a mixture or a preliminary reaction product of a polyfunctional cyanate ester and polyfunctional maleimide was known (refer to U.S. Pat. No. 4,110,364 by Gaku et al. patented on Aug. 29, 1978, which is incorporated herein as reference.

SUMMARY OF THE INVENTION

The present inventors carried out research on a curing catalyst for the above mentioned curable compositions. As a result, they found that when a peroxide and other component are used as a catalytic composite, curing speed of the composition is accelerated and, also, the adhering property of the composition is more effective than that of the composition not containing peroxide.

DETAILED DESCRIPTION OF THE INVENTION

Polyfunctional cyanate ester means a compound having at least two cyanate groups in its molecule. The polyfunctional cyanate ester is represented by the formula $$R\text{-}(O\text{---}C\equiv N)_m$$

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

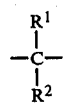

wherein $R^1$ and $R^2$ are the same or different and each represents a hydrogen atom or an alkyl group containing 1 to 4 carbon atoms,

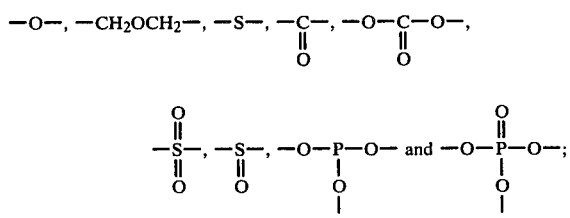

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 10, and cyanate group is always directly bonded to the aromatic nucleus.

Examples of the polyfunctional cyanate esters include 1,3- or 1,4-dicyanatobenzene; 1,3,5-tricyanatobenzene; 1,3-,1,4-,1,6-,1,8-; 2,6- or 2,7-dicyanatonaphthalene; 1,3,6-tricyanatonaphthalene; 4,4'-dicyanatobiphenyl; bis(4-cyanatophenyl)methane; bis(3-chloro-4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate and bis(3-chloro-4-cyanatophenyl)methane. Other cyanate ester employed in the practice of this invention are given in Japanese Patent Publication Nos. 41112/1971, 4791/1969 and 11712/1970 which are incorporated herein as reference. The above mentioned cyanate esters may be used as mixtures.

Prepolymers may be used containing a symtriazine ring which is prepared by the trimerization of the cyanate group of the cyanate ester, and has an average molecular weight of at least 400 but up to 6,000 at most. Such prepolymers can be prepared by polymerizing the above cyanate acid esters in the presence of, as a catalyst, an acid such as a mineral acid or a Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halides are in the form of mixtures of cyanate monomers and prepolymers, and such materials can also be used in the present invention.

The polyfunctional maleimide employed in the present invention are organic compounds having two or more maleimide groups derived from maleic anhydride and a polyamine and are represented by the following general formula

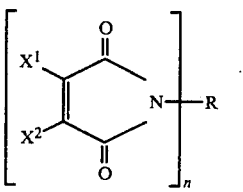

(3)

wherein R represents divalent or trivalent aromatic or alicyclic organic group, each of $X^1$ and $X^2$ represent a hydrogen atom, a halogen atom or alkyl group, and n is at least 2, generally 5 or less.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

The maleimide may be used alone or in admixture thereof. A prepolymer of the maleimide obtained by heating the maleimide in the presence or absence of a catalyst may be used.

A coprepolymer of the cyanate ester and an amine and a coprepolymer of the maleimide and an amine may be used as the cyanate ester component and the maleimide component, respectively.

Amines as a starting material for preparing polyfunctional maleimide and coprepolymer of maleimide include, for example, meta- or para-phenylenediamine, meta- or paraxylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane, 1,1-bis(4-aminophenyl)-1-phenylethane, melamine, addition product of aniline and formalin, in which benzene rings of two or more aniline molecules bond through methylene bond.

It is unnecessary that the cyanate component and the maleimide compound be separate compounds, respectively. A compound containing a cyanate group and a maleimide group in its molecule may be used. The resin composition of this invention may contain only the compound.

The curable composition of this invention comprises (i) a catalytic composite comprising a peroxide and other component and (ii) a mixture and/or preliminary reaction product of (a) polyfunctional cyanate esters, prepolymers of cyanate esters or coprepolymers of the cyanate esters and an amine and (b) polyfunctional maleimides, prepolymers of the maleimides or coprepolymers of the maleimides and an amine and optionally (c) other component. The resin component (ii) may be a mixture of components (a) and (b), or components (a), (b) and (c); a preliminary reaction product of components (a) and (b) or of components (a), (b) and (c); a mixture of a preliminary reaction product of two of components (a), (b) and (c), and the remainder thereof. Other components (c) include diallyl phthalate or its prepolymer, dicyclopentadiene or its prepolymer, acrylates, acrylic epoxy esters, acrylic alkenyl esters, trialkenyl isocyanurates or its prepolymers, dialkenyl benzenes or its prepolymers, and liquid or elastic rubbers, such as polybutadiene, butadiene-acrylonitrile rubber, natural rubbers, polyisoprene rubber, etc.

The catalytic composite comprises at least one peroxide and one or more other catalytic component. Use of a peroxide alone as a catalytic composite is not preferable, because it is impossible to shorten the raising of glass transition temperature.

The amount of the peroxide employed may be in the range of from 0.01 to 5%, preferable from 0.05 to 1% by weight on the basis of weight of the resin component. Examples of the peroxides include methyl ethyl ketone peroxide, methyl isobutyl ketone peroxide, cyclohexanone peroxide, methylcyclohexanone peroxide, 3,3,5-trimethylcyclohexanone peroxide, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, acetyl cyclohexyl sulfonyl peroxide, t-butyl hydroperoxide, cumene hydroperoxide, diisopropylbenzene hydroperoxide, p-mentane hydroperoxide, 2,5-dimethylhexane 2,5-dihydroperoxide, 1,1,3,3-tetramethylbutyl hydroperoxide, di-t-butyl peroxide, t-butyl cumyl peroxide, dicumyl peroxide, 1,4- or 1,3-bis(t-butylperoxyisopropyl)-benzene, 2,5-dimethyl-2,5-di(t-butylperoxy)hexane, 2,5-dimethyl-2,5-di-t-butylperoxyhexane-3, 1,1-bis(t-butylperoxy)-3,3,5-trimethylcyclohexane, n-butyl-4,4-bis(t-butylperoxy)valerate, 2,2,-bis(t-butylperoxy)butane, t-butyl peroxyacetate, t-butyl peroxyisobutyrate, t-butyl peroxyoctoate, t-butyl peroxypivalate, t-butyl peroxyneodecanoate, t-butyl peroxy-3,5,5-trimethyl hexanoate, t-butyl peroxybenzoate, di-t-butylperoxy phthalate, di-t-butylperoxy isophthalate, t-butylperoxy laurate, 2,5-dimethyl-2,5-dibenzoylperoxyhexane, di-2-ethylhexyl peroxydicarbonate, di-isopropyl peroxydicarbonate, di-sec-butyl peroxydicarbonate, di-n-propyl peroxydicarbonate, di-methoxyisopropyl peroxydicarbonate, di-3-methoxybutyl peroxydicarbonate, di-2-ethoxyethyl peroxydicarbonate, bis(4-t-butyl cyclohexyl)peroxydicarbonate, t-butylperoxy isopropylcarbonate, succinic acid peroxide. Of the peroxides, organic peroxides having active oxygen of less than 7% by weight, such as benzoyl peroxide (BPO), p-chlorobenzoyl peroxide, 2,4-dichlorobenzoyl peroxide, lauroyl peroxide, decanoyl peroxide, acetyl peroxide, and di-t-butylperoxyphthalate are more preferable.

Though peroxides having active oxygen of more than 7% by weight are usable as one of catalytic components peroxides having active oxygen of less than 7% by weight are preferable to peroxides having active oxygen of more than 7% by weight. The reason is that when the latter is used, it is necessary to raise heating curing temperature.

When two or more peroxides having different decomposition half-life periods each are used, degree of gelation of resin composition can be adjusted as well as promoting and inhibiting actions derived from a combination of two or more peroxides can be utilized.

Other components employed with the peroxide as catalytic components constituting the catalytic include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methyl-morpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octoate, tin oleate, dibutyl lead maleate, manganese naphthenate, cobalt naphthenate, and acetyl acetone iron; and inorganic metal salts, such as stannic chloride, zinc chloride and aluminum chloride, acid anhydrides, such as maleic anhydride, pyromellitic anhydride, trimellitic anhydride, hexahydropyromellitic anhydride and hexahydrotrimellitic anhydride, mixtures of two or more of these compounds may be used with the peroxide. The organic metal salts are more preferable. The amount of the other component employed depends on the kind of the components. In general, the amount of the component may be in the range of from 0.001 to 10% by weight on the basis of weight of the resin component.

The catalytic composite of this invention may be prepared by merely mixing peroxide with the other component.

A natural or synthetic resin, a natural or synthetic inorganic or organic filler, a reinforcing agent, a pigment and/or a dye stuff may be added to the curable composition provided that they do not impair the properties of the resulting resin.

The curable compositions of this invention are present in a wide range of forms from liquid to solid at room temperature, depending on the nature of the respective components constituting the composition and preliminary reaction conditions. Solid curable composition, liquid curable composition or solution of the composition in solvent may be used depending on the use purpose.

The curing conditions of the curable composition of this invention depend on proportion of components constituting the composition and natures of the components employed. In general, the composition of this invention may be cured by heat it at a temperature of 100°–250° C. for 5 minutes–20 hours.

The present invention is further illustrated by the following non-limiting Examples and Comparative Examples. Percent and part are by weight, unless otherwise specified.

EXAMPLE 1

2,2-bis(4-cyanatophenyl)propane and bis(4-maleimidophenyl)methane were mixed in proportions as given in Table 1. Each of the mixtures was preliminarily reacted so as to provide gelation time of 500–600 seconds at 160° C. Dicumyl peroxide was added to each of the preliminary reaction product, and gelation time of the preliminary reaction products containing dicumyl peroxide was measured. The results are shown in Table 1. Sample A uses methyl ethyl ketone as a solvent and Samples B and C use N,N-dimethyl formamide as a solvent. The dicumyl peroxide employed was dissolved in methyl ethyl ketone.

TABLE 1

| Sample | content 2,2-bis(4-cyanatophenyl)propane (%) | bis(4-maleimidophenyl)methane (%) | gelatin time 160° C. amount of dicumyl peroxide (%) | | | | |
|---|---|---|---|---|---|---|---|
| | | | 0 | 0.1 | 0.2 | 0.5 | 0.7 |
| A | 90 | 10 | 576 | 417 | 330 | 215 | 187 |
| B | 40 | 60 | 520 | 242 | 170 | 119 | 94 |
| C | 20 | 80 | 522 | 148 | 75 | 34 | 19 |

EXAMPLE 2

Each of the peroxides given in Table 2 was added to Sample B of Example 1. Similarly, gelation time of each sample was measured. The result are shown in Table 2.

TABLE 2

| Catalyst | Amount of catalyst (ppm) | Gelation time (sec) Temp. when gelation time was measured (°C.) | | | |
|---|---|---|---|---|---|
| | | 130 | 150 | 160 | 170 |
| benzoyl peroxide | 0 | 2100 | | | |
| | 0.4 | 41 | | | |
| | 0.8 | 20 | | | |
| para-chlorobenzoyl peroxide | 0 | | 930 | | |
| | 0.1 | | 45 | | |
| | 0.3 | | 12 | | |
| bis(1-hydroxy cyclohexyl) peroxide | 0 | | 930 | | |
| | 0.1 | | 33 | | |
| | 0.3 | | 4 | | |
| dicumyl peroxide | 0 | | | 520 | 250 |
| | 0.1 | | | 242 | 151 |
| | 0.3 | | | 140 | 73 |
| di-t-butyl diperphthalate | 0 | | | 520 | |
| | 0.1 | | | 120 | |
| | 0.3 | | | 70 | |
| succinic acid peroxide | 0 | | | 520 | |
| | 0.1 | | | 200 | |
| | 0.3 | | | 17 | |

Gelation time is time taken for the sample to gel after being placed on a plate maintained at the temperature indicated.

EXAMPLE 3

400 g of 2,2-bis(4-cyanatophenyl)propane and 600 g of bis(4-maleimidophenyl)ether were reacted at 140° C. for 2 hours. The reaction product was dissolved in N,N-dimethyl formamide. In the resulting solution was dissolved 100 g of epoxy resin ECN—1273 (Ciba-Geigy AG.). Then 0.3 g of zinc octoate, 8 g of benzoyl peroxide and 10 g of N,N-dimethylbenzylamine were added to the solution and the solution was agitated to form uniform solution. Glass cloth were impregnated with the solution, and heated to form the B-stage prepreg.

Six prepreg sheets sandwiched by two copper foils 35μ thich were laminate-molded at 50 Kg/cm$^2$ at 160° C. for 60 minutes. The resulting laminate was heated at 200° C. to completely cure the resin component in the laminate. Glass transition point with time and physical properties of the laminate are shown in Table 3.

CONTROL 1

The procedure of Example 3 was repeated except that benzoyl peroxide was not used. The results are shown in Table 3.

EXAMPLE 4

900 g of 2,2-bis(4-cyanatophenyl)propane, 80 g of bis(4-maleimidophenyl)methane and 20 g of mixture of 4-maleimidophenyl-3',4'-dimaleimidophenylmethane and 4-maleimidophenyl-2',4'-dimaleimidophenylmethane were reacted at 140° C. for 90 minutes. 150 g of the epoxy resin employed in Example 3 was added to the reaction product. The mixture was reacted at 140° C. for 20 minutes to form prepolymer. The resulting prepolymer was dissolved in methyl ethyl ketone. 0.5 g of zinc octoate, 10 g of N,N-dimethylbenzylamine and 2 g of lauroyl peroxide as a catalyst were added to the mixture with stirring to form a uniform mixture. Glass cloth was impregnated with the solution, and heated to form a B-stage prepreg.

Laminate was prepared from the above prepreg in the same way as in Example 3. The results are shown in Table 3.

CONTROL 2

The procedure of Example 4 was repeated except that lauroyl peroxide was not used. The results are shown in Table 3.

TABLE 3

| | Example 3 | Control 1 | Example 4 | Control 2 |
|---|---|---|---|---|
| Glass transition point after press molding of the resin at the time when the following period passed at 200° C. | | | 249 | 220 |
| 3 hrs. | 260 | 243 | | |
| 5 hrs. | 307 | 290 | | |
| 7 hrs. | 310 | 311 | | |
| Adhering force of copper foil 35μ thick (Kg/cm) | 1.55 | 1.40 | 1.70 | 1.50 |
| Float the copper-clad laminate on solder at 300° C. for 20 seconds | The resin was not damaged | " | | |
| Laminate was boiled for 8 hrs. in water and then immersed in oil at 260° C. for 20 seconds | " | " | | |
| Chemical resistance — Boiling in 1,1,1-Trichrene for 15 minutes | " | " | | |
| Immersion in 10% HCl solution for 24 hrs. | " | " | | |
| Immersion in 10% NaOH solution for 24 hrs. | " | " | | |

What is claimed is:

1. A curable resin composition comprising:
   (i) catalytic components comprising at least one peroxide and at least one other catalytic component, and
   (ii) a resin component consisting essentially of:
      (a) at least one compound selected from the group consisting of:
         (1) a polyfunctional aromatic cyanate ester monomer represented by the formula

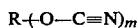
         R$\cdot$(O—C≡N)$_m$ wherein m is an integer of 2 to 10 and R is an aromatic organic group, the cyanate groups being bonded to an aromatic ring of said aromatic organic group,
         (2) a homoprepolymer of one or more cyanate esters of (1), and
         (3) a coprepolymer of (1) and an amine; and
      (b) at least one component selected from the group consisting of:
         (1) a polyfunctional maleimide,
         (2) a homoprepolymer of one or more maleimides of (1), and
         (3) a coprepolymer of (1) and an amine,
   said composition including a mixture of components (a) and (b), a preliminary reaction product of components (a) and (b), or the combination of said mixture and said preliminary reaction product.

2. The composition as defined in claim 1 wherein the peroxide is selected from the group consisting of methyl ethyl ketone peroxide, methyl isobutyl ketone peroxide, cyclohexanone peroxide, methylcyclohexanone peroxide, 3,3,5-trimethylcyclohexanone peroxide, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, acetyl cyclohexyl sulfonyl peroxide, t-butyl hydroperoxide, cumene hydroperoxide, diisopropylbenzene hydroperoxide, p-mentane hydroperoxide, 2,5-dimethylhexane 2,5-dihydroperoxide, 1,1,3,3-tetramethylbutyl hydroperoxide, di-t-butyl peroxide, t-butyl cumyl peroxide, dicumyl peroxide, 1,4- or 1,3-bis(t-butylperoxyisopropyl)benzene, 2,5-dimethyl-2,5-di(t-butylperoxy)-hexane, 2,5-dimethyl-2,5-di-t-butylperoxyhexane-3, 1,1-bis(t-butylperoxy)-3,3,5-trimethylchyclohexane, n-butyl-4,4-bis(t-butylperoxy)valerate, 2,2-bis(t-butylperoxy)butane, t-butyl peroxyacetate, t-butyl peroxyisobutyrate, t-butyl peroxyoctoate, t-butyl peroxypivalate, t-butyl peroxyneodecanoate, t-butyl peroxy-3,5,5-trimethyl hexanoate, t-butyl peroxybenzoate, di-t-butylperoxy phthalate, di-t-butylperoxy isophthalate, t-butylperoxy laurate, 2,5-dimethyl-2,5-dibenzoylperoxyhexane, di-2-ethylhexyl peroxydicarbonate, di-isopropyl peroxydicarbonate, di-sec-butyl peroxydicarbonate, di-n-propyl peroxydicarbonate, di-methoxyisopropyl peroxydicarbonate, di-3-methoxybutyl peroxydicarbonate, di-2-ethoxyethyl peroxydicarbonate, bis(4-t-butyl cyclohexyl)peroxydicarbonate, t-butylperoxy isopropylcarbonate, and succinic acid peroxide.

3. The composition as defined in claim 2 wherein the peroxide is selected from the group consisting of benzoyl peroxide (BPO), p-chlorobenzoyl peroxide, 2,4-dichlorobenzoyl peroxide, lauroyl peroxide, decanoyl peroxide, acetyl peroxide, and di-t-butylperoxyphthalate.

4. The composition as defined in claim 1 wherein the amount of peroxide employed is in the range of from 0.01 to 5% by weight on the basis of weight of component (ii).

5. The composition as defined in claim 1 wherein the other catalytic component is at least one compound selected from the group consisting of 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole, an addition product of an imidazole and trimellitic acid, N,N-dimethyl benzylamine, N,N-dimethylaniline, N,N-dimethyltoluidine, N,N-dimethyl-p-anisidine, p-halogeno-N,N-dimethylaniline, 2-n-ethylanilino ethanol, tri-n-butylamine, pyridine, quinoline, N-methylmorpholine, triethanolamine, triethylenediamine, N,N,N',N'-tetramethylbutanediamine, N-methylpiperidine, phenol, cresol, xylenol, resorcine, phloroglucin, lead naphthenate, lead stearate, zinc naphthenate, zinc oleate, tin octoate, dibutyl lead maleate, manganese naphthenate, cobalt naphthenate, acetyl acetone iron, stannic chloride, zinc chloride aluminum chloride, maleic anhydride, pyromellitic anhydride, trimellitic anhydride, hexahydropyromellitic anhydride and hexahydrotrimellitic anhydride, and mixtures of two or more of these compounds.

6. The composition as defined in claim 5 wherein the catalytic component is selected from the group consisting of lead naphthenate, lead stearate, zinc naphthenate, zinc oleate, tin oleate, dibutyl lead maleate, manganese naphthenate, cobalt naphthenate and acetyl acetone iron.

7. The composition as defined in claim 1 wherein the cyanate ester is selected from the group consisting of 1,3- or 1,4-dicyanatobenzene; 1,3,5-tricyanatobenzene; 1,3-,1,4-,1,6-,1,8-; 2,6- or 2,7-dicyanatonaphthalene; 1,3,6-tricyanatonaphthalene; 4,4'-dicyanatobiphenyl; bis(4-cyanatophenyl)methane; bis(3-chloro-4-cyanatophenyl)methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis-(4-cyanatophenyl)thioether; bis(4-cyanatophenyl)sulfone; tris(4-cyanatophenyl)phosphite; tris(4-cyanatophenyl)phosphate and bis(3-chloro-4-cyanatophenyl)methane.

8. The composition as defined in claim 1 wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of:

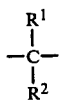

wherein $R^1$ and $R^2$ are the same or different and each represents a hydrogen atom or an alkyl group containing 1 to 4 carbon atoms,

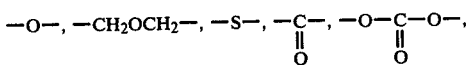

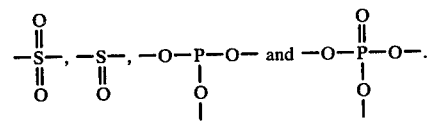

9. The composition as defined in claim 8 wherein the aromatic nucleus of the polyfunctional cyanate ester is substituted by a substituent selected from the group consisting of alkyl groups containing 1 to 4 carbon atoms, alkoxy groups containing 1 to 4 carbon atoms, chlorine and bromine.

* * * * *